United States Patent
Bryson et al.

(10) Patent No.: US 9,911,084 B2
(45) Date of Patent: Mar. 6, 2018

(54) AUTONOMOUS VEHICLE SCHEDULING SYSTEM FOR PICKUP AND DROP-OFF OF PASSENGERS

(71) Applicant: International Business Machines Corporation, Armonk, NY (US)

(72) Inventors: Donald L. Bryson, Chattanooga, TN (US); Eric Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 44 days.

(21) Appl. No.: 15/013,017

(22) Filed: Feb. 2, 2016

(65) Prior Publication Data

US 2017/0219362 A1 Aug. 3, 2017

(51) Int. Cl.
*G01C 22/00* (2006.01)
*G06Q 10/00* (2012.01)
*G01C 21/20* (2006.01)

(52) U.S. Cl.
CPC ........... *G06Q 10/00* (2013.01); *G01C 21/206* (2013.01)

(58) Field of Classification Search
CPC .. G01C 21/3438; G01C 21/34; G05D 1/0088; G06Q 50/30; G06F 17/60; G08G 1/202
USPC ........ 701/23, 410, 461, 426, 538; 705/13, 5; 700/276; 340/932.2
See application file for complete search history.

(56) References Cited

U.S. PATENT DOCUMENTS

| 4,361,202 | A | * | 11/1982 | Minovitch | B60K 31/0008 |
| | | | | | 104/88.02 |
| 8,082,095 | B2 | * | 12/2011 | Sumcad | G01C 21/3438 |
| | | | | | 701/423 |
| 2014/0309789 | A1 | * | 10/2014 | Ricci | B60Q 1/00 |
| | | | | | 700/276 |
| 2015/0219464 | A1 | * | 8/2015 | Beaurepaire | G01C 21/3617 |
| | | | | | 701/538 |

(Continued)

FOREIGN PATENT DOCUMENTS

WO 2015114592 A1 8/2015

OTHER PUBLICATIONS

Sang Hyum Kim: "Airport Control Through Intelligent Gate Assignment"; Georgia Institute of Technology; Aug. 2013; pp. 144.

*Primary Examiner* — Shardul Patel
(74) *Attorney, Agent, or Firm* — Cantor Colburn LLP; Tihon Poltavets

(57) ABSTRACT

An aspect of the disclosure includes a method, a system and a computer program product for scheduling a pickup of a passenger with an autonomous vehicle at a facility with a plurality of egress locations. The method includes receiving a pickup request for a passenger from a facility having a plurality of egress locations. A first pickup time is determined for each of the plurality of egress locations. A first egress location is selected from the plurality of egress locations based at least in part on the first pickup time at the first egress location, a position of the passenger and a queue time. A first signal is transmitted that includes a proposed pickup time and location to the passenger. An autonomous vehicle is moved from a first location to the first egress location. The passenger is picked up at the first egress location.

20 Claims, 7 Drawing Sheets

(56) References Cited

U.S. PATENT DOCUMENTS

| | | | |
|---|---|---|---|
| 2015/0369621 A1* | 12/2015 | Abhyanker | G01C 21/36 701/461 |
| 2016/0019790 A1* | 1/2016 | Tobolski | G06Q 10/02 340/932.2 |
| 2016/0116293 A1* | 4/2016 | Grover | G01C 21/34 701/23 |
| 2016/0370194 A1* | 12/2016 | Colijn | G01C 21/343 |

* cited by examiner

AUTONOMOUS VEHICLE SCHEDULING SYSTEM FOR PICKUP AND DROP-OFF OF PASSENGERS

BACKGROUND

The present invention relates generally to a system and method for operating an autonomous vehicle, and in particular to a system and method for scheduling an autonomous vehicle for picking up or dropping passengers off at a facility with multiple egresses.

Autonomous vehicles, such as autonomous automobiles for example, allow for independent or semi-independent operation from an operator. This allows the autonomous vehicle to perform tasks such as transporting passengers between locations and automatic parking. Autonomous vehicles include multiple sensors that allow the vehicle to navigate the environment. The sensors allow the autonomous vehicle receive information regarding the surrounding environment, such as obstacles, traffic data and the like. This allows the autonomous vehicle to automatically respond to this information and change the operation of the vehicle to negotiate terrain, avoid obstacles or travel a particular route.

SUMMARY

Embodiments include a method, system, and computer program product for scheduling a pickup of a passenger with an autonomous vehicle at a facility with a plurality of egress locations. The method includes receiving a pickup request for a passenger from a facility having a plurality of egress locations. A first pickup time is determined for each of the plurality of egress locations. A first egress location is selected from the plurality of egress locations based at least in part on the first pickup time at the first egress location, a position of the passenger and a queue time. A first signal is transmitted that includes a proposed pickup time and location to the passenger. An autonomous vehicle is moved from a first location to the first egress location. The passenger is picked up at the first egress location.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
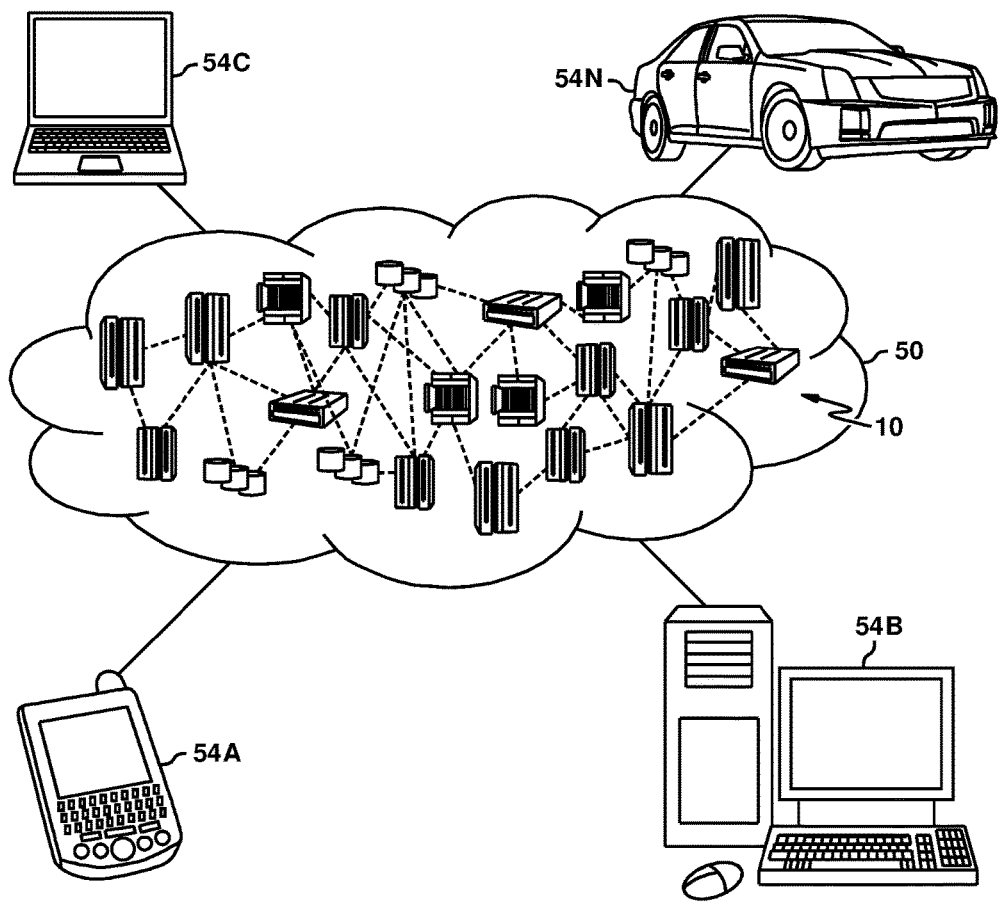
FIG. 1 depicts a cloud computing environment according to an embodiment.

Embodiments of the present disclosure provide for a system and method for the scheduling of the operation of autonomous vehicles at a facility having multiple egresses. Embodiments provide for the scheduling of autonomous vehicle to allow passengers to be transported, picked up and dropped off at the facility with a reduced or no wait time. Further embodiments provide for determining a pickup location based on physical attributes of the passenger to decrease or increase the amount of effort the passenger will exert to reach the pickup location. Still further embodiments provide for the changing of the autonomous vehicle scheduling to accommodate emergency vehicles.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
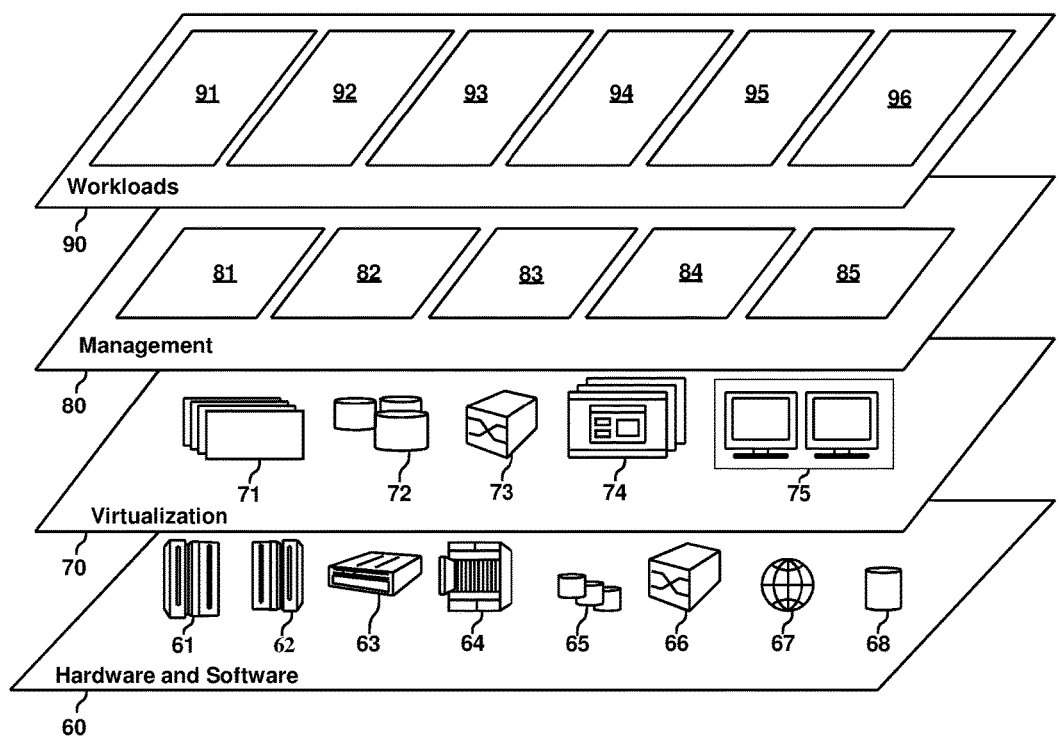
FIG. 2 depicts abstraction model layers according to an embodiment.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and an autonomous vehicle schedule processing 96. The autonomous vehicle schedule processing 96 may perform one or more methods that allow for the picking up or dropping off of passengers at a facility having multiple egresses, such as but not limited to the methods described in reference to FIGS. 3-7 for example.

Figure 3:
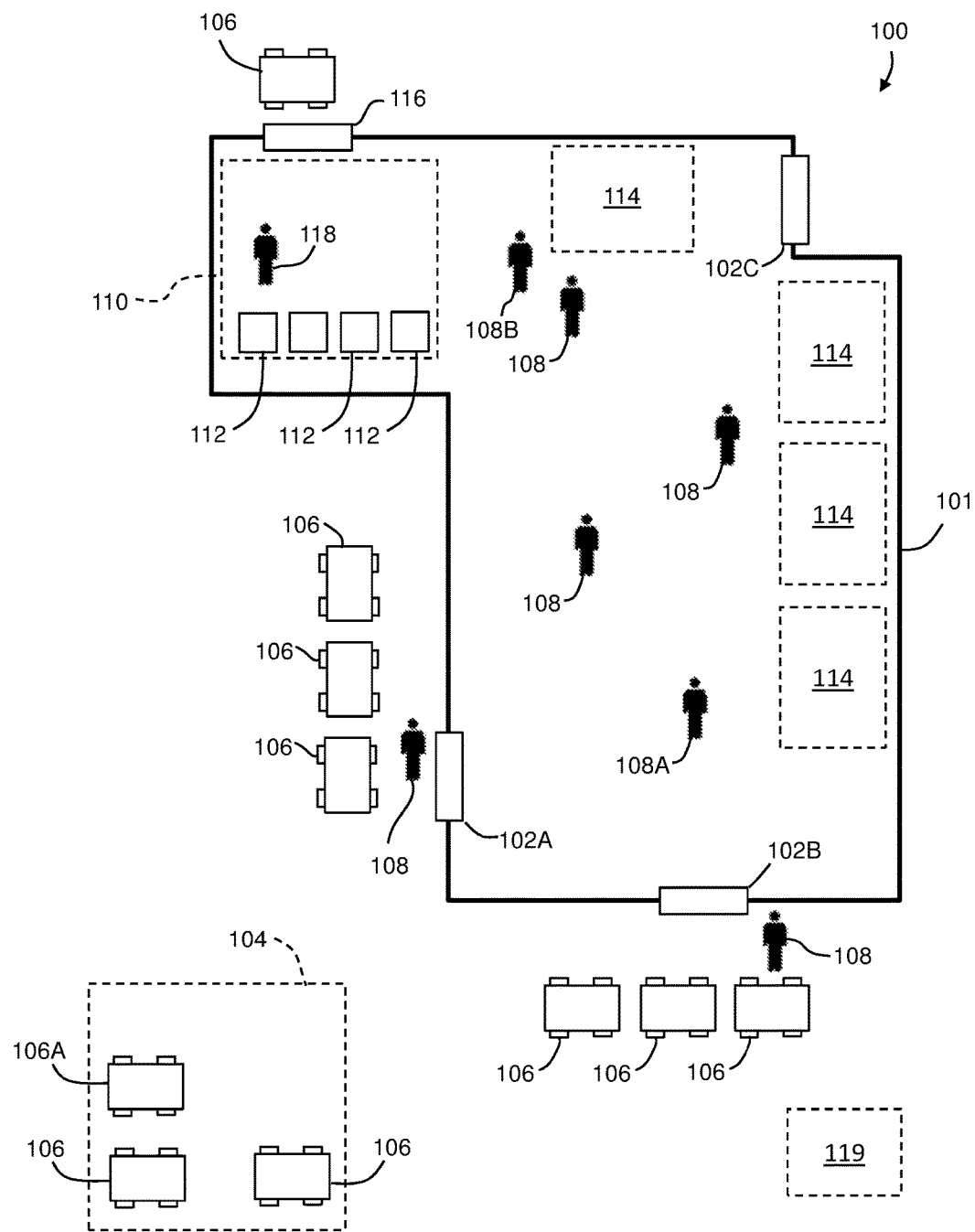
FIG. 3 depicts a schematic diagram of a facility allowing for pickup and drop off of passengers from autonomous vehicles in accordance with some embodiments.

Referring now to FIG. 3, a facility 100 is shown that includes at least one building 101 having plurality of egress locations 102A-102C. The facility 100 may include, but is not limited to, a retail establishment, a shopping center, a shopping mall, a hospital, a school, an office building, an entertainment center, a theater, an arena, or a sports stadium for example. The facility further includes a parking area 104 for autonomous vehicles 106 to be positioned while their passengers (e.g. the autonomous vehicle owner) are in the building 101. It should be appreciated that the parking area 104 may be co-located with the building 101 or positioned remotely.

The facility 100 is configured to allow passengers 108 to embark and disembark from the autonomous vehicles 106 at the egress locations 102A-102C. In an embodiment, the facility 100 may also include a loading area 110 that allows the transfer of items 112 or cargo to transport in autonomous vehicles 106. It should be appreciated that the loading area 110 may be co-located in the building 101 as illustrated, or may be remotely positioned from the building 101. As discussed in more detail herein, the items 112 may be articles or goods purchased by the passengers 108 at retail establishments 114 located within the building. In an embodiment the loading area 110 is configured to allow the autonomous vehicles to move adjacent an egress location 116 to allow facility personnel 118 to transfer the items 112 into the autonomous vehicle 106.

As will be discussed in more detail herein, the facility 100 may include an autonomous vehicle scheduling system 119 that schedules the pickup of passengers 108 by the autonomous vehicles 106. The system 119 may be a computing system locally at the facility 100 or may be a distributed or cloud based computing system, such as cloud computing environment 50 for example. Further, in some embodiments the system 119 also schedules the dropping off of passengers 108 at the facility 100.

Figure 4:
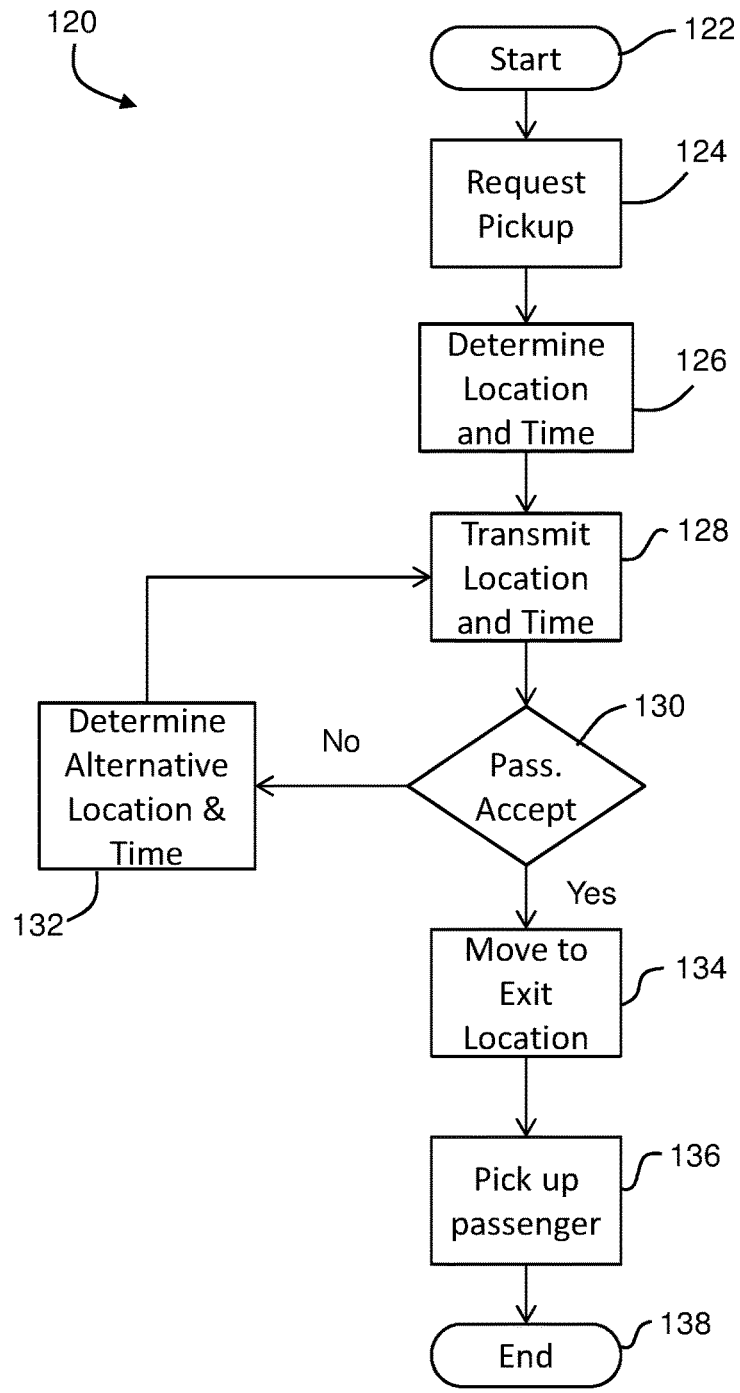
FIG. 4 depicts a flow diagram of a method for picking up passengers from the facility of FIG. 3 in accordance with some embodiments.

Referring now to FIG. 4, with continuing reference to FIG. 3, a method 120 is shown for scheduling a pickup of a passenger 108 at one of the egress locations 102A-102C by an autonomous vehicle 106. The method 120 starts in block 122 and proceeds to block 124 where a pickup request is received from one of the passengers 108 in the facility 100. The signal requesting pickup may be transmitted by the passenger 108 using an application executed on their cell phone 54 or through a kiosk terminal located within the building 101 for example. In an embodiment, the pickup signal is transmitted from the passenger 108 to their autonomous vehicle 106. In some embodiments, the pickup time may be prearranged by the passenger 108, such as when they disembark from the autonomous vehicle. The autonomous vehicle 106 may then communicate with the system 119 for scheduling. In another embodiment, the pickup signal it received by the system 119, which then communicates with the autonomous vehicle 106.

The method 120 then proceeds to block 126 where the egress location and time that the passenger 108 may be picked up by the autonomous vehicle 106 is determined. In the exemplary embodiment, the egress location and time are based at least in part on the location of the passenger 108, the location where the autonomous vehicle 106 is parked and the queue time for each of the egress locations 102A-102C. This determination may include determining the passenger 108 location by triangulating an approximate location using cellular antennas that receive signals from the passenger's mobile device, or with computer network access points (e.g. WiFi routers). The location of autonomous vehicle 106 may be determined by a GPS signal for example. In other embodiments, the autonomous vehicle 106 may be assigned a predetermined parking location after dropping-off the passenger 108 and the location is already known. With the locations of the passenger 108 and autonomous vehicle 106 determined, a time period for both the passenger 108 and autonomous vehicle 106 to reach each egress location 102A-102C may be determined. The speed that the passenger moves from the current location to an egress location may be based on a predetermined speed, such as from a profile established by the passenger 108, or be determined based on the current speed the passenger 108 is walking. In an embodiment, the method may periodically update the time for pickup based on the progress made by the passenger 108 in moving towards the egress location. Where the number of egress locations is small, the determination of which egress location may be determined using a brute force method that determines all possible combinations of egress locations and queue times. In some embodiments, the determination is performed as a multi-knapsack problem in which the constraints are associated with the egress locations and the objective function is the time for the passenger 108 to be picked up by the autonomous vehicle 106.

For example, when the passenger 108A seeks to depart from the building 101, the egress locations 102A and 102B are closest. However, the queue time for each of these locations may be lengthy due to earlier pickup requests from other passengers 108. In this example, it may be determined that the egress location 102C should be used to save time and avoid waiting in line for other passengers 108 to depart. This egress location 102C may be desired even though the distance from the passenger 108A and the autonomous vehicle 106A to the egress location 102C is greater than to locations 102A, 102B. It should be appreciated that the determination of the egress location may further be based on the travel time for the passenger and the autonomous vehicle to reach the desired egress location.

The method 120 then proceeds to block 128 where the proposed egress location for pickup is transmitted to the user along with an expected time that the autonomous vehicle will be prepared to receive the passenger. In an embodiment, the method 120 then proceeds to query block 130 where the passenger accepts or declines the proposed egress location and time. In an embodiment, the signal with the proposed egress location and time are transmitted to the passenger's mobile device. When the query block 130 returns a negative, meaning the passenger declines the egress location and time, the method 120 proceeds to block 132 where alternative egress locations and times are determined. In an embodiment, the passenger may indicate why the proposed egress time and location are unacceptable, for example, given the time and/or location of the egress location, it may be too great of a time and/or distance for the passenger to cover, or the passenger has decided to stop at an additional retail location 114. When the alternative proposed egress location and time are determined, the method 120 loops back to block 128 and the new proposed egress location and time are transmitted to the passenger.

In an embodiment, the signal with the proposed egress location and time may include a plurality of proposed egress locations and associated times that are listed in a ranked order. In an embodiment, the ranked order may be based on user-defined criteria, such as distance to the egress location or speed of departure for example. In this embodiment, the passenger selects the egress location and time from the proposed list of egress locations and times and the accepted egress location and time are transmitted back to the system 119.

When the query block 130 returns a positive, meaning the proposed egress location and time are accepted, the method 120 proceeds to block 134 where the passenger and the autonomous vehicle move to the egress location. The autonomous vehicle may enter a queue of other autonomous vehicles and wait for its turn to pick up the passenger in block 136. The passenger then departs from the facility 100 and the method 120 stops in block 138.

It should be appreciated that the process 120 may also be used to schedule the drop off of passengers at the facility. When the passenger programs their autonomous vehicle to bring them to the facility 100, the autonomous vehicle may contact the system 119 and determine which egress location the passenger should disembark from the autonomous vehicle. In an embodiment, the passenger may indicate which retail establishment 114 they wish to visit first. The system 119 may then determine which egress location 102A-102C for the autonomous vehicle 106 to travel to, based, at least in part, on the passengers end destination (e.g., retail establishment 114), the expected time of arrival and the predicted queue time for the egress locations at the expected time of arrival.

It should be appreciated that while embodiments herein describe the scheduling of autonomous vehicles at a shopping center, this is for exemplary purposes and the claimed embodiment should not be so limited. In other embodiments, the system 119 may be used to efficiently schedule the delivery of goods for example. In still other embodiments, the facility 100 may be a hospital and the system 119 may be used to schedule the simultaneous arrival of multiple emergency vehicles with emergency personnel (e.g., load balancing), such as in an emergency medical situation for example.

Figure 5:
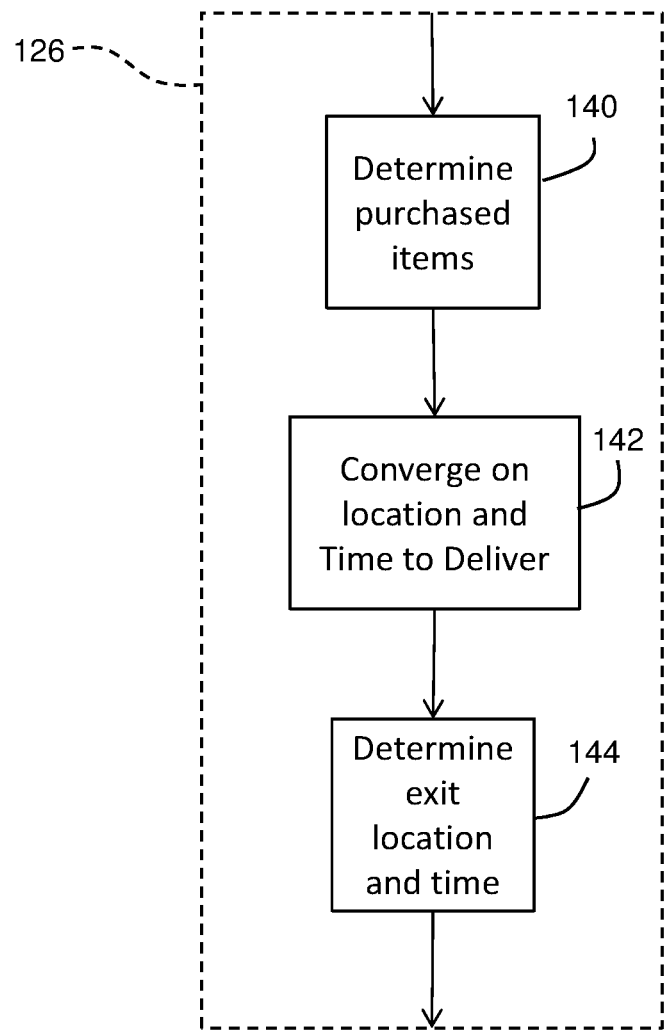
FIG. 5 depicts a flow diagram of a portion of the method of FIG. 4 where the pickup location and time are based on the pickup of packages or cargo in accordance with some embodiments.

Referring now to FIG. 5, with continuing reference to FIG. 3 and FIG. 4, an embodiment is shown for determining the egress location and time. In this embodiment, the passenger 108 does not carry their purchases, or at least some of their purchases, with them while they are shopping. The method 120 determines what items have been purchased in block 140. In an embodiment, this determination may be performed by querying the point-of-sale systems for each of the retailers at the facility to determine what items have been purchased. In another embodiment, this determination may be performed by a retailer point-of-sale or inventory system preemptively transmitting a signal when a purchase is made. The purchase information is cumulated and stored as the passenger 108 continues to make purchases. The method 120 then proceeds to block 142 where a solution is converged upon to determine a proposed egress location and estimated delivery time to deliver the purchased goods to that location. It should be appreciated that the time to deliver may include communicating with the retail establishment 114 to determine when their resources could deliver the purchased goods to each egress location 102A-102C. In an embodiment, the time to deliver from each retail establishment may be a range of time (e.g. 15 minutes-25 minutes). In an embodiment, the proposed egress location and time are further based on the size or weight of the purchased goods.

In another embodiment, the purchased goods may be loaded into the autonomous vehicle 106 at the loading area 110. In this embodiment, the time to retrieve the purchased goods (or have the retail establishment deliver them to the loading area 110), the time for the autonomous vehicle 106 to travel to the loading area 110, the queue time at the loading area and the amount of time to load the autonomous vehicle may be factors used to determine the location and time to deliver in block 142.

The method 120 then proceeds to block 144 where the egress location and time are determined. It should be appreciated that in embodiments where the purchased goods are delivered to the location where the passenger will be picked up, blocks 142 and 144 may be solved simultaneously. Where the purchased goods are loaded in the loading area 110, the proposed egress location and time may be further based on the time for the purchased goods to be loaded into the autonomous vehicle and the time for the autonomous vehicle to travel to the proposed egress location.

Figure 6:
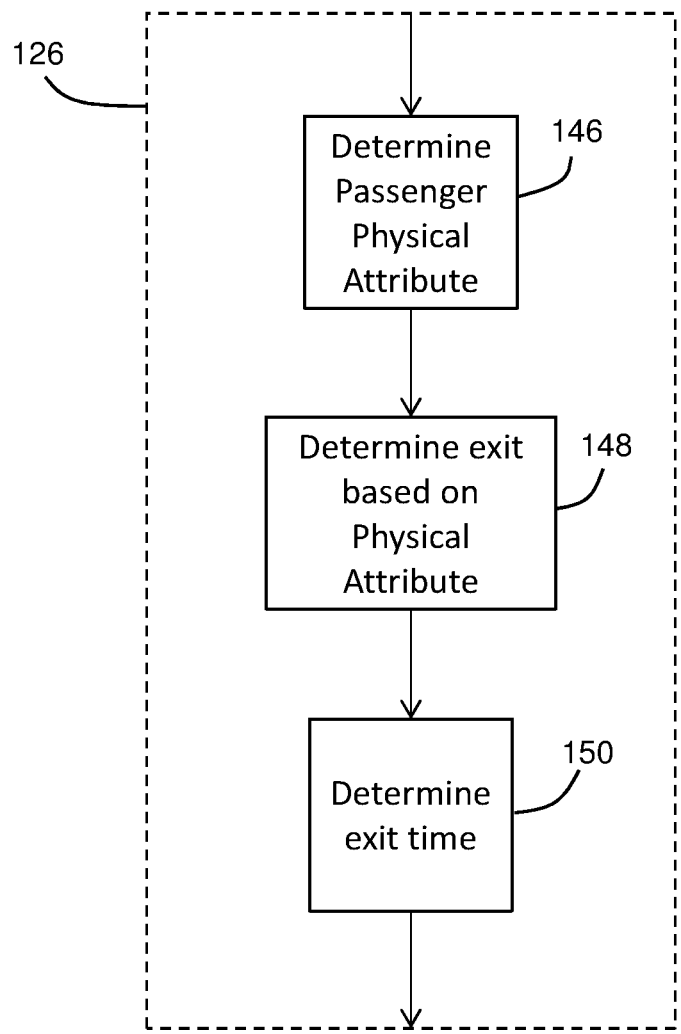
FIG. 6 depicts a flow diagram of a portion of the method of FIG. 4 where the pickup location and time are based on the passengers physical status in accordance with some embodiments.

Referring now to FIG. 6, with continuing reference to FIG. 3 and FIG. 4, another embodiment is shown for determining the egress location and time. In this embodiment, the method 120 determines at least one physical attribute of the passenger in block 146. The physical attribute may be a physical limitation, such as but not limited to vision impairments, or a physical disablement for example, that creates difficulties for the passenger to move about the facility. The physical attribute may also be a medical condition, such as asthma for example, that may occur on a periodic or regular basis. In the case of either a physical limitation or a, medical condition, the physical attribute may limit or otherwise affect the passengers ability to comfortably reach an egress location. The method 120 then proceeds to block 148 where the egress location is determined based on the identified physical attribute. For example, passenger 108A may be hindered by a leg injury, this physical attribute may prioritize the closest egress location (e.g. location 102B) even though the queue time for this location may be longer than another egress location such as location 102C, which requires the passenger 108A to climb stairs or take an elevator. The method 120 then proceeds to block 150 where the egress time at the proposed egress location is determined.

In still other embodiments, the physical attribute may be based on biometric data about the passenger. For example, the passenger may be wearing a wearable device (e.g. a pedometer or a heart rate monitor) parameters indicative of their activity level. The measured biometric data may be associated with desired goals set by the passenger. For example, the passenger may desire to walk a predetermined number of steps per day. In this embodiment, the proposed egress location may be based at least in part on the biometric data and the goals defined by the passenger. For example, the passenger 108B may have a desired goal of 10,000 steps taken per day. When determining the proposed egress location, the physical attribute may be a measurement that the passenger 108B may have walked 6,000 steps that day. To assist the passenger 108B with achieving their goal, the egress location 102B may be proposed since it is the farthest egress from the passenger 108B's current location. This allows passenger 108B to take additional steps while walking to the proposed egress location and assists the passenger 108B in reaching their daily goal.

It should be appreciated that the passenger's physical attribute may also be used for prioritizing the egress of the passenger from the facility 100 based on a physical limitation or condition. For example, if the passenger 108A is susceptible to asthma and is feeling short of breath, the system 119 may allow the reprioritization of autonomous vehicles 106 at egress location 102B (e.g. the closest egress location for passenger 108A) so that their autonomous vehicle 106A moves to the head of the queue. This would allow the passenger 108A to depart quickly from the facility 100.

Figure 7:
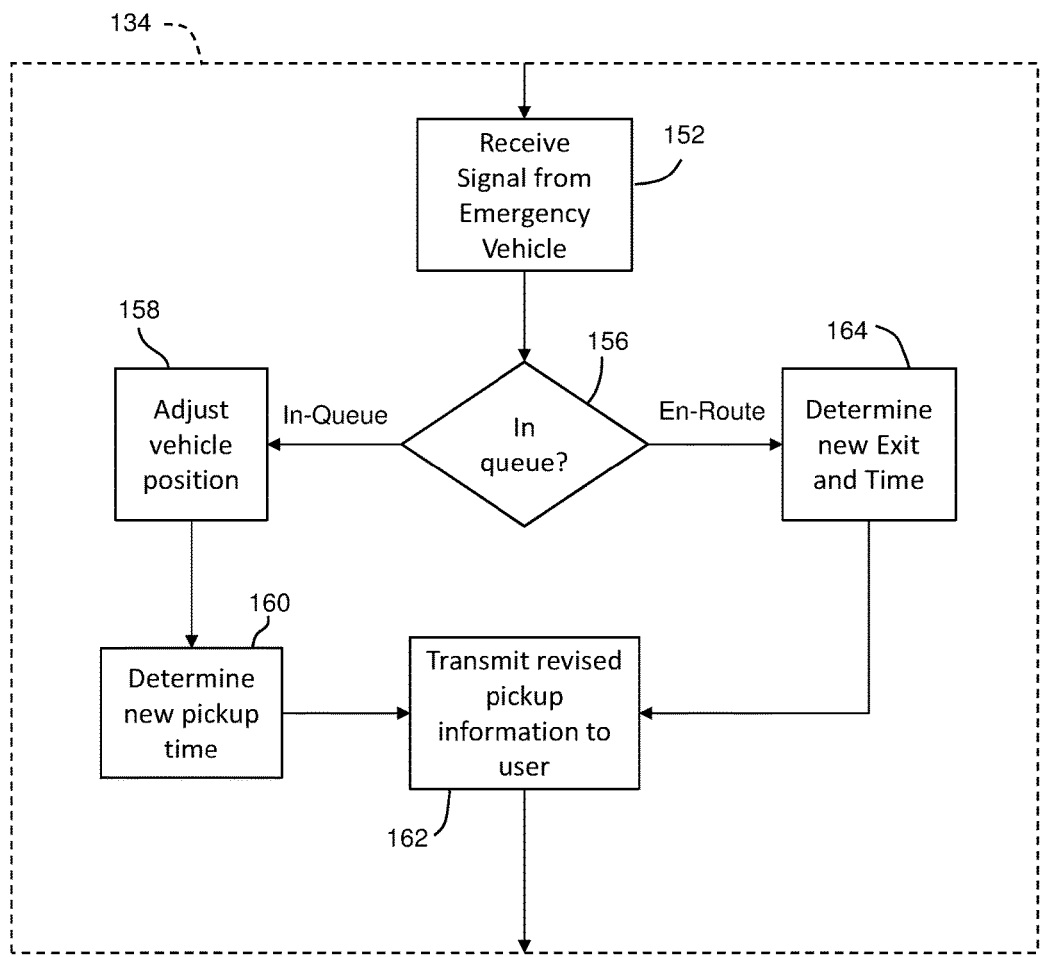
FIG. 7 depicts a flow diagram of a portion of the method of FIG. 4 where an emergency vehicle adjusts the operation of the autonomous vehicles in accordance with some embodiments.

Referring now to FIG. 7, with continuing reference to FIG. 3 and FIG. 4, an embodiment is shown of a method for accommodating emergency vehicles. As used herein, an emergency vehicle is a vehicle having personnel that are urgently needed in the facility 100, such as but not limited to, law enforcement and security vehicles, fire engines, ambulances, and utility (e.g. electrical or gas) vehicles for example. It should be appreciated that it is desired to provide these emergency vehicles with rapid access to the facility 100 to provide the desired services. In these situations, the method 120 receives a signal from the emergency vehicle in block 152 such as when the autonomous vehicle 106 is moving from the parking area 104 or is in queue at the egress location. The method 120 then proceeds to query block 154 where it is determined whether the autonomous vehicle is in the queue or is en-route to the queue.

When the autonomous vehicle is in the queue, it is determined whether the vehicle position needs to be adjusted in block 158. For example, the position of the autonomous vehicles may be moved to clear a position for the emergency vehicle in front of the egress location. The determination of the position of the autonomous vehicles may be known based on their position in the queue or via a GPS signal. The emergency vehicle may transmit a signal that indicates whether the autonomous vehicles should be moved from the area. In other embodiments, the emergency vehicle may include sensors, such as cameras or optical/electromagnetic sensors (e.g. RADAR or LIDAR), that determine the number and position of the autonomous vehicles as the emergency vehicle approaches the egress location. The determination of whether to move the autonomous vehicles may then be determined by the emergency vehicle (or the operator of the emergency vehicle) and a signal is transmitted either directly to the autonomous vehicles 106 or to the system 119. Where the emergency vehicle transmits a signal directly to autonomous vehicles 106 may perform a predetermined movement (e.g. move a predetermined location or distance from the egress) or the signal may include instructions on how the autonomous vehicle should move. Where the signal is transmitted to the system 119, the system 119 may in turn transmit a signal to the autonomous vehicles. The signal from system 119 may include an instruction to perform a predetermined action (predetermined location or distance from egress) or specific movement direction. In other embodiments, the autonomous vehicles may stay fixed in their present location. In one embodiment, the movement of the autonomous vehicles in the queue is based on the type of emergency vehicle that is approaching. For example, an ambulance may desire for the area in front of the egress location to be cleared, while law enforcement personnel may desire for the autonomous vehicles to stay in position. The method 120 then proceeds to block 160 where a new pickup time is determined and the revised pickup information is transmitted to the passenger in block 162.

Returning to query block 156, when it is determined that the autonomous vehicle is en-route to the egress location, the method 120 proceeds to block 164 where a new egress location and time are determined. In other words, the autonomous vehicles that are en-route may be re-directed to other egress locations to allow their passengers to depart from the facility 100 while providing access for the emergency vehicle. When the new egress location and time are determined, the method 120 proceeds to transmit the revised information in block 162. It should be appreciated that the information transmitted in block 162 may include information that the presence of an emergency vehicle resulted in the change of egress location.

Technical effects and benefits of the embodiments include providing a system and method for scheduling the picking up and dropping off of passengers from a facility to increase the efficiency and flow of traffic around the facility and reduce wait times for the passengers.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by a processor on a server, a pickup request from a passenger at a facility having a plurality of egress locations, wherein the server is in electronic communication with an autonomous vehicle;
   determining, by the processor, a first pickup time for each of the plurality of egress locations;
   selecting a first egress location from the plurality of egress locations based, at least in part, on the first pickup time at the first egress location, a position of the passenger, and a queue time;
   transmitting to the passenger a first signal that includes a proposed pickup time and location;
   providing instructions to the autonomous vehicle to proceed from a first location to the first egress location; and
   receiving an indication from the autonomous vehicle that the passenger was picked up at the first egress location.

2. The method of claim 1, further comprising receiving a second signal that includes an acceptance or denial of the proposed pickup time and location by the passenger.

3. The method of claim 2, further comprising determining a second pickup time at a second egress location of the plurality of egress locations and transmitting a second proposed pickup time and location to the passenger.

4. The method of claim 1, wherein the determining the proposed pickup time further comprises:
determining a number of items for transport in the autonomous vehicle;
determining a time to deliver each of the number of items to each of the plurality of egress locations; and
wherein the selecting the first egress location from the plurality of egress locations is further based at least in part on the time to deliver each of the number of items to the first egress location.

5. The method of claim 4, wherein the number of items are purchases made by the passenger at retail establishments and the determining the time to deliver is based at least in part on an estimated delivery time by each of the retail establishments.

6. The method of claim 4, further comprising:
moving the autonomous vehicle to a loading area prior to moving to the first egress location; and
loading the number of items into the autonomous vehicle at the loading area.

7. The method of claim 1, wherein the selecting the first egress location is further based in part on physical attributes of the passenger.

8. The method of claim 7, wherein the physical attributes include a physical limitation and the first egress location is a closest egress location of the plurality of egress locations.

9. The method of claim 7, wherein the physical attributes include biometric data about an activity level of the passenger and the first egress location is an egress location that increases the activity level.

10. The method of claim 1, further comprising:
receiving a third signal from a priority vehicle; and
determining a third pickup time based at least in part on the third signal and the proposed pickup time and location.

11. The method of claim 10, wherein the priority vehicle is one of a law enforcement vehicle, a fire engine and an ambulance.

12. A system comprising:
a memory having computer readable instructions; and
one or more processors for executing the computer readable instructions, the computer readable instructions comprising:
receiving a pickup request from a passenger at a facility having a plurality of egress locations;
determining a first pickup time for each of the plurality of egress locations;
selecting a first egress location from the plurality of egress locations based at least in part on the first pickup time at the first egress location, a position of the passenger and a queue time;
transmitting a first signal that includes a proposed pickup time and location to the passenger;
providing instructions to a first autonomous vehicle of the one or more autonomous vehicles to proceed from a first location to the first egress location; and
receiving an indication from the first autonomous vehicle that the passenger, in the autonomous vehicle, was picked up at the first egress location.

13. The system of claim 12, wherein the computer readable instructions further comprise receiving a second signal that includes an acceptance or denial of the proposed pickup time and location by the passenger.

14. The system of claim 12, wherein the computer readable instructions further comprise determining a second pickup time at a second egress location of the plurality of egress locations and transmitting a second proposed pickup time and location to the passenger.

15. The system of claim 12, wherein the determining the proposed pickup time further comprises:
determining a number of items for transport in the autonomous vehicle;
determining a time to deliver each of the number of items to each of the plurality of egress locations; and
wherein the selecting the first egress location from the plurality of egress locations is further based at least in part on the time to deliver each of the number of items to the first egress location.

16. The system of claim 12, wherein the selecting the first egress location is further based in part on physical attributes of the passenger.

17. The system of claim 12, wherein the computer readable instructions further comprise:
receiving a third signal from a priority vehicle;
determining a third pickup time based at least in part on the third signal and the proposed pickup time and location; and
wherein the priority vehicle is one of a law enforcement vehicle, a fire engine and an ambulance.

18. A computer program product for scheduling a pickup of a passenger with an autonomous vehicle at a facility with a plurality of egress locations, the computer program product comprising a non-transitory computer readable storage medium having program instructions embodied therewith, the program instructions executable by a processor to cause the processor to perform:
receiving a pickup request from the passenger at the facility having a plurality of egress locations;
determining a first pickup time for each of the plurality of egress locations;
selecting a first egress location from the plurality of egress locations based at least in part on the first pickup time at the first egress location, a position of the passenger and a queue time;
transmitting a first signal that includes a proposed pickup time and location to the passenger;
providing instructions to the autonomous vehicle to proceed from a first location to the first egress location; and
receiving an indication from the autonomous vehicle that the passenger was picked up at the first egress location.

19. The computer program product of claim 18, wherein the processor further performs:
determining a number of items for transport in the autonomous vehicle;
determining a time to deliver each of the number of items to each of the plurality of egress locations; and
wherein the selecting the first egress location from the plurality of egress locations is further based at least in part on the time to deliver each of the number of items to the first egress location.

20. The computer program product of claim 18, wherein the processor further performs:
receiving a third signal from a priority vehicle;
determining a third pickup time based at least in part on the third signal and the proposed pickup time and location; and
wherein the priority vehicle is one of a law enforcement vehicle, a fire engine and an ambulance.

* * * * *